United States Patent [19]

Lehmann

[11] Patent Number: 5,197,174
[45] Date of Patent: Mar. 30, 1993

[54] CONTROLLED DEFLECTION ROLL

[75] Inventor: Rolf Lehmann, Rudolfstetten, Switzerland

[73] Assignee: Sulzer Escher Wyss AG, Zurich, Switzerland

[21] Appl. No.: 663,829

[22] PCT Filed: Aug. 1, 1990

[86] PCT No.: PCT/EP90/01254
§ 371 Date: Mar. 29, 1991
§ 102(e) Date: Mar. 29, 1991

[87] PCT Pub. No.: WO91/02173
PCT Pub. Date: Feb. 21, 1991

[30] Foreign Application Priority Data

Aug. 4, 1989 [CH] Switzerland ............ 02891/89

[51] Int. Cl.⁵ ............................................. B21B 13/02
[52] U.S. Cl. .................................... 492/7; 492/5
[58] Field of Search ............ 29/116.1, 116.2, 113.1, 29/113.2

[56] References Cited

U.S. PATENT DOCUMENTS

| | | | |
|---|---|---|---|
| 3,802,044 | 4/1974 | Spillmann et al. | |
| 4,047,273 | 9/1977 | Biondetti | 29/116.2 |
| 4,090,282 | 5/1978 | Lehmann | 29/116.2 |
| 4,106,405 | 8/1978 | Biondetti et al. | 29/116.2 X |
| 4,198,905 | 4/1980 | Lehmann | 29/116.2 X |
| 4,458,517 | 7/1984 | Schuwerk | 29/116.2 X |
| 4,776,069 | 10/1988 | Snellman | 29/116.2 X |
| 4,805,279 | 2/1989 | Pav | 29/116.2 |
| 5,060,357 | 10/1991 | Roerig et al. | 29/113.2 |
| 5,111,563 | 5/1992 | Brown et al. | 29/116.1 X |

FOREIGN PATENT DOCUMENTS

| | | |
|---|---|---|
| 0315567 | 5/1989 | European Pat. Off. . |
| 2325721 | 4/1976 | Fed. Rep. of Germany . |
| 3710724 | 5/1988 | Fed. Rep. of Germany . |
| 8815224 | 4/1989 | Fed. Rep. of Germany . |
| 2381201 | 9/1978 | France . |
| 61-24813 | 2/1986 | Japan . |
| 610991 | 5/1979 | Switzerland . |

Primary Examiner—Timothy V. Eley
Attorney, Agent, or Firm—Sandler Greenblum & Bernstein

[57] ABSTRACT

In a roll arrangement having a material web travelling between a controlled deflection roll and a counter roll, an increased edge compression of the material web at the edges is prevented in that there are provided additional spreading elements effective transverse to the pressing plane (E), which elliptically deform the roll shell, and thus, cause a reduction of the pressing force of the hydraulic support elements which are effective in the pressing plane. By means of a control device, e.g. partition walls which are synchronously axially displaceable by spindles there is achieved the result that upon altering of the working width only the required support elements receive pressurized medium, and equally, only the spreading elements located externally of the working width.

11 Claims, 3 Drawing Sheets

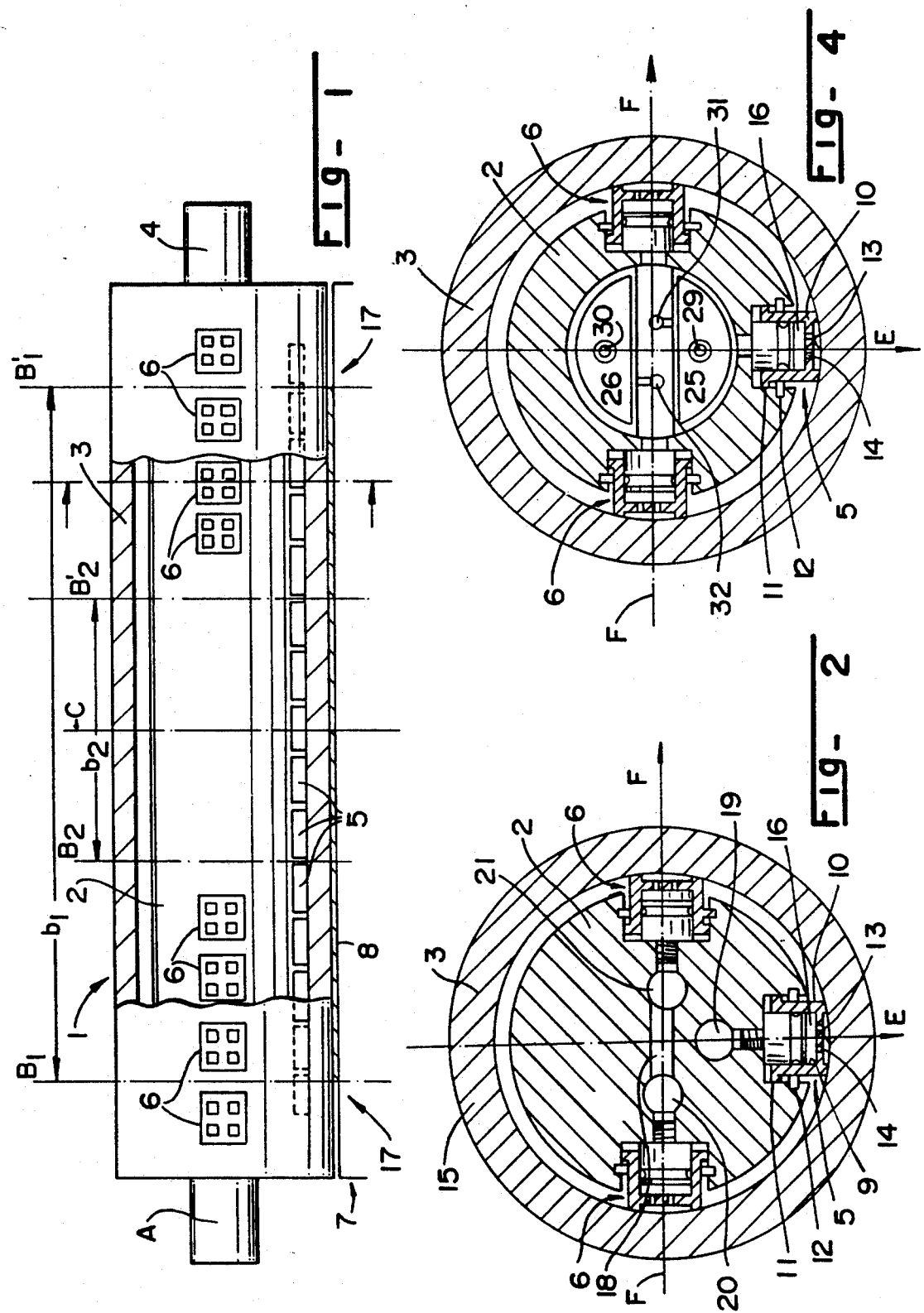

CONTROLLED DEFLECTION ROLL

BACKGROUND OF THE INVENTION

1. Technological Field

The invention relates to a controlled deflection roll having a rotatable roll shell supported in a pressing plane in relation to a non-rotatable carrier by a row of neighboring hydraulic support elements, wherein the support elements can be supplied by infeed lines from the carrier with hydraulic pressurized medium generating a pressing force, and wherein there is provided a control device by means of which only a selectable part of neighboring support elements are supplied with pressurized medium.

2. State of the Art

One such roll is known, for instance, from the Swiss Patent No. 610,991, granted May 15, 1979 and serves for the pressure treatment of material webs, for example, for pressing paper-, cardboard-, textile- or other fiber material webs, for the rolling of metal foils or sheets, for the manufacture of plastic foils or as the pressing device of rotary printing machines. By means of the hydraulic support elements there can be produced an adjustable or regulatable pressing force upon the material web. By means of the control device, which can comprise, for instance, partition walls which are displaceable in the axial direction of the roll or an alterable or exchangeable mounting element in the carrier, it is possible to change the working width of the roll, that is, the number of simultaneously impinged neighboring support elements in the axial direction of the roll and to accommodate such to the width of the material web.

What is disadvantageous for rolling apparatuses working with such type rolls is that directly at the edges of the processed material web there can arise, for different reasons, an excessive compression, known as edge compression, which renders unusable a relatively large part of the marginal portions of the material web and sometimes requires appreciable cutting.

In German Patent No. 2,325,721, published Sep. 18, 1975, it is known, on the other hand, to overcome or compensate this excessive edge compression by support elements at the ends of the roll shell which are effective in a direction opposite to the pressing direction. What is here disadvantageous is that by virtue of these so-called counter support sources the entire pressing force effective in the pressing plane and thus the line force is altered, requiring a complicated regulation. Additionally, the counter support sources are only effective when they are arranged in the direct neighborhood of a guide device of the roll shell, which stabilizes the cross-section of the roll shell at this location and prevents a deformation of the cross-section. Upon undertaking a desired adjustment of the working width of such a roll-,—which is not as such contemplated by the patent—, such counter support elements must, however, be provided directly neighboring the edges of the material web. At a certain distance from the ends of the roll shell, where there are provided the guide devices, such counter support sources become, however, ineffective due to the shell deformation of the roll shell which here becomes effective, so that the excessive edge compression no longer can be eliminated or compensated with a certain reduction in the working width.

SUMMARY OF THE INVENTION

The invention has for its object to eliminate the aforementioned drawbacks of the prior art and, in particular, to further develop a controlled deflection roll of the previously mentioned type in such a manner that with a decrease in size of the working width of the roll there is limited the line force to the web width by impinging only a part of neighboring support elements without changing or influencing the pressing force and there is avoided an excessive edge compression of the treated material web also at greater distances from the ends of the roll shell.

According to the invention this is achieved in that the roll shell is supported at least at its end regions in relation to the carrier by means of additional hydraulic spreading elements effective essentially perpendicular to the pressing plane and likewise can be supplied with a hydraulic pressurized medium, wherein the control device supplies the spreading elements with pressurized medium only in those axial sections of the roll where the corresponding support elements are not supplied with pressurized medium.

In so doing, the invention exploits the recognition gained from the German Petty Patent No. 8,815,224, registered Feb. 23, 1989, that an elastic roll shell elliptically deforms due to the bowl effect upon exerting forces at the inner surface thereof transverse to the pressing plane by means of so-called spreading elements. As a result, the roll shell within the pressing nip is retracted at the corresponding locations, so that the pressing force is reduced at the corresponding locations or is reversed in negative direction, so that the roll shell no longer contacts the counter roll externally of the material web, and specifically, without there being altered the total pressing force effective in the pressing plane, that is, without influencing the line force, and without there being required for this purpose special additional devices for stabilizing the cross-section of the roll shell.

The control device for the simultaneous impingement of the support sources and the spreading sources with pressurized medium can advantageously comprise partition walls which are synchronously displaceable in the axial direction of the roll, and which can be conjointly displaced within the carrier such that spreading elements only receive pressurized medium in those axial sections in which the actual support elements are not supplied with pressurized medium, that is, at the edges, whereas, conversely, the support elements only receive pressurized medium at those locations where there are not impinged the spreading elements, that is, at the central region of the roll.

In order to be able to use the full range of possible adjustment of the working width while simultaneously eliminating an increased edge compression, it is advantageous if the rows of support elements and the spreading elements overlap at least at a predetermined width adjustment region. Further, the hydraulic support elements and the hydraulic spreading elements are arranged in respective overlapping rows in the axial direction of the roll shell, wherein the rows of hydraulic support elements and the hydraulic spreading elements overlap each other in predetermined axial regions of the roll shell.

According to a further advantageous embodiment of the invention, there is fitted in the carrier a mounting element containing the pressurized medium infeed lines, and the connection bores leading to the support elements and to the spreading elements are selectively connectable with different longitudinal bores in the mounting element, or the entire mounting element can be exchanged for a different one having different bores. According to a further development of the invention, the connection of the connection bores with the longitudinal bores can be accomplished by rotating the mounting element within the carrier.

BRIEF DESCRIPTION OF THE DRAWINGS

The invention will be more fully explained in conjunction with the exemplary embodiments illustrated in the Figures. Wherein:

FIG. 1 illustrates a controlled deflection roll in axial sectional view;

FIG. 2 is an axial cross-section through the roll of FIG. 1;

FIG. 4 is a cross-section through the roll of FIG. 3;

DETAILED DESCRIPTION OF THE PREFERRED EMBODIMENTS

Figure 3:
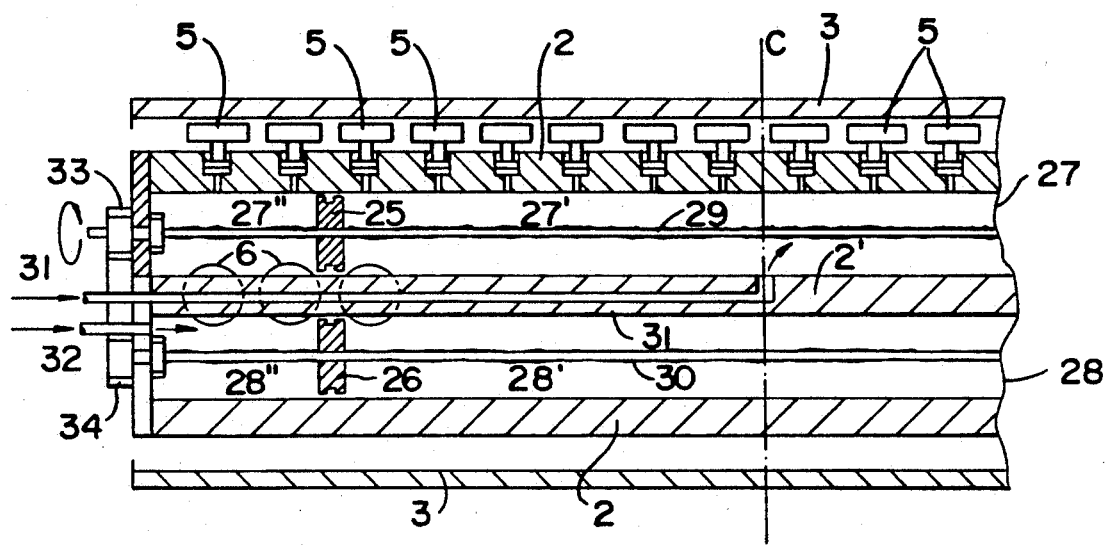
FIG. 3 is an axial section through a controlled deflection roll with adjustment device.

With the embodiment depicted in FIGS. 1 and 2, a controlled deflection roll 1 cooperates with a counter roll 7 which can be conventionally constructed as a solid roll or hollow roll, or, however, also as a controlled deflection roll, and exerts a pressing force upon a material web 8 which passes between both rolls 1 and 7.

The controlled deflection roll 1 comprises a non-rotatable carrier 2, the journals of which are mounted in a suitable roll stand, as well as a roll shell 3 rotatable about the carrier 2. This roll shell 3 is supported against the carrier 2 in a pressing plane E by a row of hydraulic support elements 5 which are closely arranged adjacent one another in the axial direction A. By means of these support elements 5 the roll shell 3 is radially movable in the pressing plane E in relation to the carrier 2 and at the same time is rotatably mounted upon the contact surfaces of the support elements 5. The support elements 5 can be constructed as hydrostatic support elements according to U.S. Pat. No. 3,802,044, granted Apr. 9, 1974 or in a suitable different manner. The support element 5 shown by way of example in FIG. 2, comprises a punch 10 whose cylindrical inner surface 9 sealingly encloses a piston 11, so that the punch 10 can move in the operative direction of the support element 5, that is, in radial direction in the pressing plane E. In so doing, its movement is limited by stop rings 12. At its contact surface the punch 10 possesses hydrostatic bearing pockets 13 which are connected by bores 14 within the punch 10 with the cylinder chamber 16. By means of a line 19 the cylinder chamber 16 and the bearing pockets 13 are supplied with a hydraulic pressurized medium of an adjustable or regulatable pressure, whereby the pressing force exerted by the support elements 5 in the direction of the counter roll 7 can be adjusted or regulated.

On the other hand, the side 15 of the roll shell 3 situated opposite the support elements 5 in the pressing plane E is devoid of any support elements which act in the opposite direction. Instead, additional hydraulic spreading elements 6 are provided in an operating plane F at least approximately perpendicular or transverse to the pressing plane E, and constructed analogously to the support elements 5 effective in the pressing plane E. In so doing, it is advantageous to dimension these additional spreading elements 6 such that in the transverse plane F there can be exerted a pressing force upon the roll shell 3 by the additional spreading elements 6 which, in accordance with the stiffness of the roll shell, causes an effective and sufficiently large deformation.

The described controlled deflection roll is constructed in such a manner that its working width, that is, that axial extent of which where there is exerted a pressing force, can be adjusted to the width of the material web 8 to be processed, that is, between the extreme values between the planes $B_1$ and $B_1'$, corresponding to a working width $b_1$, and the distance $B_2-B_2'$, corresponding to a working width $b_2$. In this embodiment, the support elements 5 are provided at least in the central portion of the roll between the planes $B_1$ and $B_1'$, whereas they can be absent in the marginal regions 17 externally of $B_1$ and $B_1'$. Conversely, spreading elements 6 are provided at least from the ends of the roll shell up to the plane $B_2$ at the one side and up to $B_2'$ at the other side, whereas the center of the roll can be devoid of spreading elements between the planes $B_2$ and $B_2'$.

As will be apparent from FIG. 2, the spreading elements 6 are likewise connected with infeed lines 20 and 21 in the carrier 2 for hydraulic pressurized medium. In so doing, the infeed lines of each two opposite spreading elements 16 can be connected with a connection line 18, so that they receive the same pressure of the pressurized medium.

In order to operate the described roll, the control device for the supply of the support elements 5 and the spreading elements 6 is constructed such that for a working width selectable within a predetermined range, and corresponding to the width of the material web to be processed, there are only impinged with pressurized medium the support elements 5 located within the working width, whereas the support elements 5 located externally of the working width are maintained devoid of pressure, and conversely, only the spreading elements 6 located externally of the working width receive pressurized medium, whereas the spreading elements 6 located within the selected working width are devoid of pressure. In this way there is ensured that a pressing force is exerted upon the material web within the working width, whereas externally of the working width there are only effective spreading forces, by means of which, owing to the elliptical deformation of the roll shell in these outer regions 17, there is reduced or even reversed the pressing force of the roll shell 3, so that the roll shell 3 is load-relieved in the presence of an appropriate spreading force or, in fact, no longer contacts the counter roll 7 at the outer region 17. In this manner there is prevented with great certainty an over-compression of the margins or edges of the material web, and specifically, independent of the set working width. What is of particular advantage in this regard is that the spreading elements 6 are only effective transverse to the pressing plane E, that is, without any force components in the pressing plane E, that is, the entire pressing force is not influenced or altered by the pressure force of the spreading elements 6.

The control of the impingement of the pressurized medium at the support elements 5 and spreading elements 6 can be accomplished both in a mechanical manner as well as also by electrical control of valves provided in the individual infeed lines.

FIGS. 3 and 4 depict a control device for the impingement of the support sources 5 and the spreading sources 6 with pressurized medium with the aid of adjustable partition walls 25 and 26, respectively, which are displaceable in bores 27 and 28 of the carrier 2 by means of spindles 29, 30 in the axial direction of the roll. The spindles 29 and 30 possess at both sides of the central plane C an opposite thread pitch, so that both of the partition walls 25 located at opposite sides of the central plane C always move opposite to one another. The same holds true for the spindle 30 and the partition walls 26. Consequently, the pressure chambers 27 and 28 are divided, in each case, into central pressure chambers 27' and 28', respectively, and outer pressure chambers 27" and 28", respectively. Additionally, at the central portion of the carrier 2' there are provided infeed lines 31 and 32 for hydraulic pressurized medium, wherein the one infeed line 31 opens at the center of the intermediate pressure chamber 27', whereas the other infeed line 32 opens at the end regions of both pressure chambers 28". The support elements 5 are thus connected with the pressure chambers 27, whereas the spreading elements 6 are connected with the pressure chambers 28. Additionally, both of the spindles 29 and 30 are coupled with one another at one end of the roll by means of gears 33 and 34 or by means of an other coupling device, such that they can be only simultaneously and conjointly rotated, for instance, by means of a crank 35, as shown, for instance, in FIG. 5. In this way there is achieved the result that the partition walls 25 and 26 are also synchronously displaced, that is, in conjunction with one another and in the same direction through the same path. As a result, the support elements 5 are always only impinged in the region between both of the partition walls 25, whereas the spreading elements 6 are only impinged externally of this region with pressurized medium.

Figure 5:
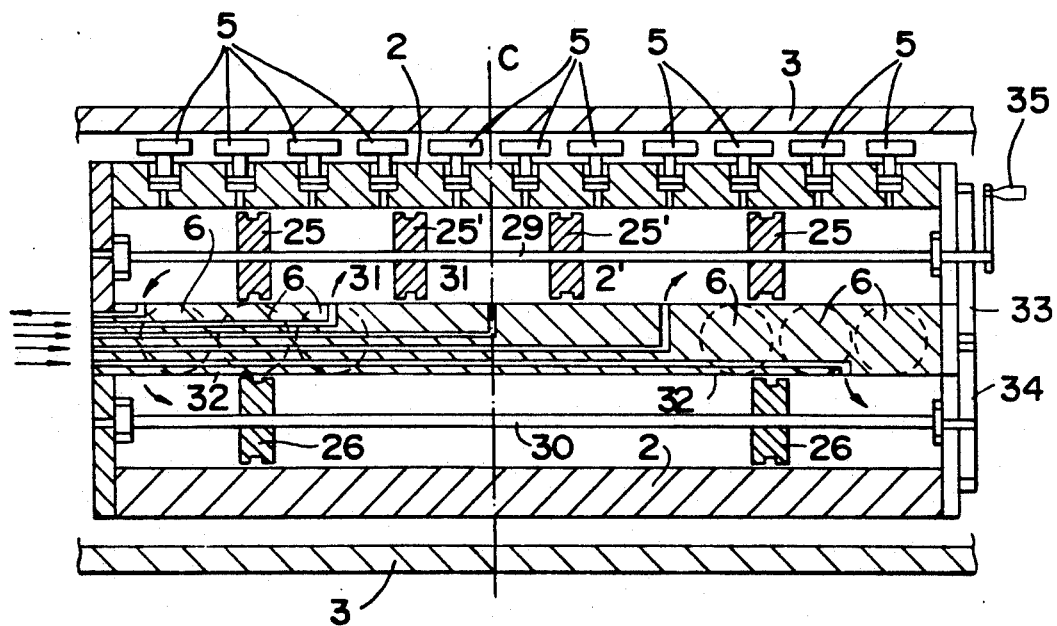
FIG. 5 is an axial section through a multi-zone controlled deflection roll.

FIG. 5 depicts a controlled deflection roll with more than two partition walls 25, 25' at the side of the support elements 5, which can be positionally adjusted by means of a spindle having in sections different thread pitch. As a result, there are formed three zones in the working region of the roll, in which there can be exerted a different pressing force. By means of the spindle adjustment, these zones can be proportionally changed in their length with respect to one another. Just as was the case for the previously described embodiments, at the side of the spreading elements 6 there are only provided two partition walls 26 for limiting both of the outer zones, which can be synchronously adjusted together with the outer partition walls 25.

Figure 6:
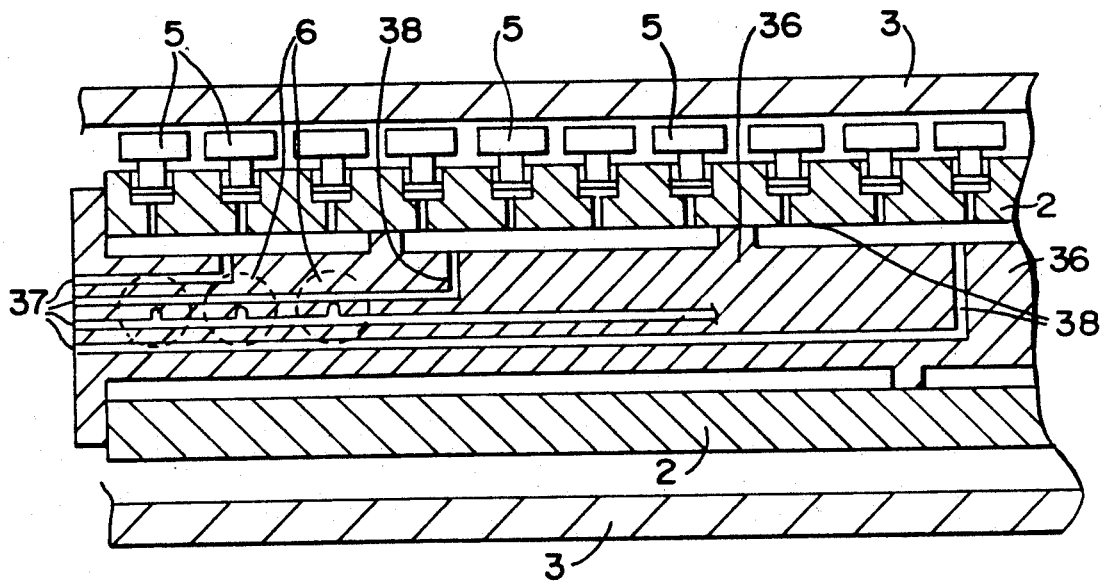
FIG. 6 is an axial section through a controlled deflection roll with a mounting element.

FIG. 6 shows a roll in whose carrier 2 there is fitted a removable mounting element 36 which contains a number of axial longitudinal bores 37 which communicate by connection bores 38 in each case with the infeed lines of the pressure chambers of both the support elements 5 and also the spreading elements 6. For operating the roll according to the invention, in the desired setting of the working width the connection bores 38 which are not required are closed by plugs and the required connection bores are opened, so that each pressure chamber receives the correct pressure, or the entire mounting element 36 can be exchanged for a different one having other connection bores.

Figure 7:
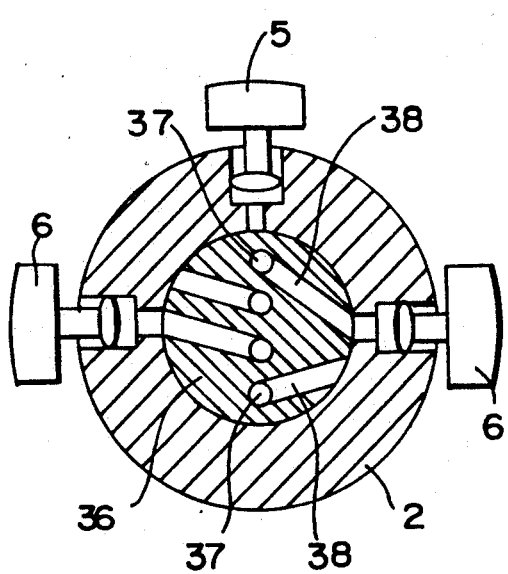
FIGS. 7 and 8 are respective cross-sections through the carrier of a controlled deflection roll with rotatable mounting element in two planes.
Figure 8:
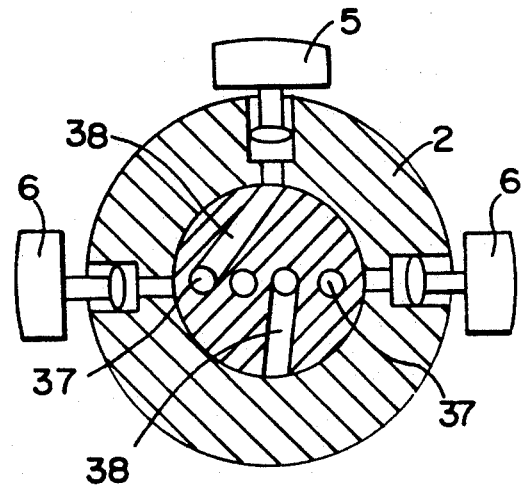

As has been illustrated in cross-section in FIG. 7, the connection bores 38 can be provided so as to be turned in angular disposition, so that the individual pressure chambers can be connected to other longitudinal bores 37 by simply rotating the mounting element 36 within the carrier 2, without having to dismantle or exchange the mounting element 36.

While there are shown and described present preferred embodiments of the invention, it is distinctly to be understood the invention is not limited thereto, but may be otherwise variously embodied and practiced within the scope of the following claims.

What is claimed is:

1. A controlled deflection roll, comprising:
   a rotatable roll shell having oppositely situated and regions;
   a non-rotatable carrier;
   a row of neighboring hydraulic support elements for supporting the rotatable roll shell in relation to the non-rotatable carrier in a predetermined pressing plane;
   infeed lines for supplying from the carrier row of neighboring hydraulic support elements with hydraulic pressurized medium exerting a pressing force at the roll shell;
   a control device for selectively controlling the supply of the hydraulic pressurized medium to only a predetermined part of the row of neighboring support elements;
   hydraulic spreading elements for further supporting the roll shell at least in said oppositely situated end regions in relation to the carrier;
   means for supplying the hydraulic spreading elements with hydraulic pressurized medium for exerting a force effective essentially in an operating plane disposed substantially perpendicular to the predetermined pressing plane; and
   the control device controlling the selective supply of hydraulic pressurized medium to the hydraulic spreading elements located only in predetermined axial sections of the controlled deflection roll where associated hydraulic support elements in said predetermined axial sections are devoid of a supply of hydraulic pressurized medium.

2. The controlled deflection roll according to claim 1, wherein:
   the hydraulic spreading elements are structured to be radially movable in the operating plane.

3. The controlled deflection roll according to claim 1, wherein:
   the roll shell has a central region;
   the hydraulic spreading elements are only provided at both oppositely situated end regions of the roll shell; and
   the central region of the roll shell is devoid of hydraulic spreading elements.

4. The controlled deflection roll according to claim 3, wherein:
   the roll shell has an axial direction; and
   the hydraulic support elements and the hydraulic spreading elements are arranged in respective overlapping rows in the axial direction of the roll shell, wherein said rows of hydraulic support elements and the hydraulic spreading elements overlap each other in predetermined axial regions of the roll shell.

5. The controlled deflection roll according to claim 1, wherein:
the hydraulic spreading elements are dimensioned for exerting a force, defining the force effective essentially in the operating plane, which reduces the pressing force of the roll shell in the predetermined pressing plane by a predetermined amount.

6. The controlled deflection roll according to claim 1, wherein:
each of the hydraulic support elements defines hydrostatic support elements radially displaceable in an associated pressure chamber in a predetermined operative direction;
each of the hydraulic support elements possesses bearing pockets at bearing surfaces confronting the roll shell;
bore means for connecting the bearing pockets of the hydraulic support elements with the pressure chambers thereof;
each of the hydraulic spreading element defines hydrostatic support elements radially displaceable in an associated pressure chamber in a predetermined operative direction;
each of the hydraulic support elements possesses bearing pockets at bearing surfaces confronting the roll shell; and
bore means for connecting the bearing pockets of the hydraulic support elements with the pressure chambers thereof.

7. The controlled deflection roll according to claim 6, wherein:
the infeed lines for supplying the hydraulic support elements with hydraulic pressurized medium and the means for supplying the hydraulic spreading elements with hydraulic pressurized medium for exerting a force effective essentially in an operating plane disposed substantially perpendicular to the predetermined pressing plane supply the pressure chambers of the hydraulic support elements which are effective in the predetermined pressing plane and the pressure chambers of the hydraulic spreading elements which are effective in a transverse direction in the operating plane with pressurized medium at different pressures.

8. The controlled deflection roll according to claim 1, wherein:
the supplying means for the hydraulic spreading elements comprise infeed lines for the hydraulic pressurized medium; and
the control device comprises:
partition walls; and
means for conjointly synchronously axially displacing the partition walls in order that the hydraulic support elements and the hydraulic spreading elements can be connected to different pressurized medium infeed lines and movement of the partition walls is intercoupled in such a manner that the hydraulic spreading elements are automatically coupled with a pressure less infeed line when an associated hydraulic support element, in the same axial section of the controlled deflection roll, is supplied with hydraulic pressurized medium.

9. The controlled deflection roll according to claim 8, wherein:
the roll shell has a central plane; and
the means for conjointly synchronously axially displacing the partition walls comprises operatively intercoupled spindles for adjustably displacing the partition walls; and
said operatively intercoupled spindles have opposite pitch threads located to opposite sides of the central plane.

10. The controlled deflection roll according to claim 1, wherein:
said infeed lines comprise confection lines provided for the carrier;
the control device comprises an exchangeable mounting element having longitudinal bores and mounted in the carrier; and
said exchangeable mounting element, upon exchange thereof for a different exchangeable mounting element, enabling the confection lines of the carrier leading to the hydraulic support elements and to the hydraulic spreading elements to be selectively connected with different longitudinal bores in the exchangeable mounting element.

11. The controlled deflection roll according to claim 1, wherein:
said infeed lines comprise connection lines provided for the carrier;
the control device comprises a movable mounting element having longitudinal bores and mounted in the carrier; and
said movable mounting element, upon selective movement thereof, enabling the confection lines of the carrier leading to the hydraulic support elements and to the hydraulic spreading elements to be selectively connected with different longitudinal bores in the movable mounting element.

* * * * *